Patented Mar. 2, 1943

2,312,482

UNITED STATES PATENT OFFICE 2,312,482

DERIVATIVES OF THE CYCLOPENTANO-POLYHYDROPHENANTHRENE SERIES

Tadeus Reichstein, Basel, Switzerland, assignor, by mesne assignments, to Roche-Organon, Inc., Nutley, N. J., a corporation of New Jersey No Drawing. Application January 9, 1939, Serial No. 250,025. In the Netherlands January 13, 1938

13 Claims. (Cl. 260—397.4)

This invention relates to derivatives of the cyclopentano-dimethyl-polyhydro-phenanthrene series having at the carbon atom $C_{17}$ a side chain of the form -CHOH.CH$_2$OH, carrying further substituents in the ring system, and more particularly to those compounds of this class as contain a carbonyl group at the carbon atom $C_3$.

The substances mentioned are valuable as medicines or as intermediates for the production of medicines.

According to the invention the compounds mentioned are prepared from cyclopentano-dimethyl-polyhydro-phenanthrene derivatives having the same side chain but having at the carbon atom $C_3$ a hydroxyl group.

Hence it is an object of my invention to subject these polyhydroxy compounds to an oxidation so that the hydroxyl group at $C_3$ is converted to a carbonyl group.

However, if the polyhydroxy compounds were oxidized the side chain would also be attacked. This can be prevented by protecting the hydroxyl groups in the side chain against attack by the oxidant.

Hence it is more particularly the object of my invention to oxidize the polyhydroxy compounds in such a form that the hydroxyls in the side chain are not attacked.

The protection of the hydroxyl groups in the side chain can be effected in different ways.

I have found that the simplest method is to prepare a compound of the acetal type with a carbonyl compound which is possible in this case as the hydroxyl groups in the side chain are attached to adjacent carbon atoms.

These acetal compounds have the side chain

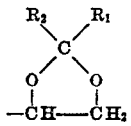

in which $R_1$ and $R_2$ are alkyl radicals or $R_1$=H and $R_2$ is an alkyl radical.

This means that aldehydes as well as ketones can be used. Further, aliphatic as well as alicyclic carbonyl compounds can be used, e. g. acetone and cyclohexanone.

By saponification in an acid solution the hydroxyl groups can be regenerated.

On the other hand it is possible to prepare compounds in which the hydroxyl groups of the side chain are protected by acylation. These compounds may be prepared by a series of partial acylations and saponifications. One may e. g. start with diacetoxy-3.21-pregnene-5-one-20 which is carefully reduced so that the carbonyl group at $C_{20}$ is converted to a hydroxyl group. The product is then esterified with benzoylchloride to the benzoate-20. This may be partially saponified to set free the hydroxyl groups at $C_3$ and $C_{21}$. Now the hydroxyl group at $C_{21}$ being a primary hydroxyl group can be esterified e. g. with benzoylchloride without esterifying the hydroxyl group at $C_3$. In this way the compounds with a free hydroxyl group at $C_3$ and protected hydroxyl groups in the side chain are obtained.

This method of protecting the side chain is, of course, less simple than the first mentioned method.

The oxidation can be carried out with all oxidants which are known to be suitable for the conversion of a hydroxyl group to a carbonyl group. The method of oxidizing with a carbonyl compound in the presence of an alcoholate of aluminium or magnesium chloride is especially suitable in this case (cf. British Patent Specification No. 487,360).

When the starting materials for the process of this invention have been prepared by reduction of the corresponding compounds with a carbonyl group at $C_{20}$ the resulting polyhydroxy compound is a mixture of two stereo-isomers. This isomerism is due to the reduction of the carbonyl group.

The two isomers also form two different acetal compounds. It is, however, not necessary to separate the isomers when carrying out the oxidation according to the present invention. A separation may be effected with the product of the oxidation, e. g. by chromatographic analysis, by fractional crystallisation, etc.

Further substituents in the molecule do not interfere with the process of this invention. So e. g. a hydroxyl group at $C_{17}$, if any, would not enter into the reaction because of its low reactivity as a tertiary hydroxyl group.

If other hydroxyl groups were present in the ring system, e. g. at $C_{11}$, these could possibly be oxidized to carbonyl groups. This, however, is irrelevant for the purpose of this invention.

EXAMPLE

As a starting material pregnene-5-triol-3.20.21 is taken. This may e. g. be prepared from pregnene-5-diol-3.21-one-20 or its derivatives acylated in the hydroxyl groups at $C_3$ and/or at $C_{21}$ by careful reduction, e. g. with isopropylalcohol and aluminium-isopropylate, according to Meerwein-Ponndorff. If acyl derivatives were used the reduction product must further be saponified. In this way the free pregnene-5-triol-3.20.21 can be obtained as a mixture of two isomers forming colourless crystals melting at 204–218°.

This forms the starting material for the treatment according to the invention, as follows:

(a) *Preparation of mono-acetone compound*

570 mg. of triol were dissolved in 300 cm.$^3$ of dry acetone and shaken for 6 days with 6 g. of anhydrous copper sulfate. The copper sulfate was thereupon filtered off, the solution was shaken with potassium carbonate and evaporated to dryness. The crystalline residue was sublimated in a high vacuum [0.01 mm. and 140–160°]. A non-distillable residue remained. The sublimate was recrystallized from ether-pentane The yield was 355 mg. of crystals melting at 146° (corr.), resolidifying upon further heating and melting again at 166–169° (corr.) $[\alpha]^{21}_D = -51° \pm 3°$ ($c = 2.737$ in acetone).

The compound gives an intense yellow colour with nitro-methane showing the presence of a double bond.

(b) *Oxidation of mono-acetone compound*

375 mg. of the monoacetonepregnenetriol prepared according to (a) were dissolved in 8 cm.$^3$ of dry acetone and refluxed for 14 hours with a solution of 0.8 g. of aluminium tertiary butylate in 30 cm.$^3$ of benzene. Then the acetone was removed, the solution taken up in ether and washed subsequently with a concentrated seignette salt solution, sodium carbonate solution and water. The washings were again extracted with ether and added to the bulk of the extract. The united ethereal extracts were then dried and evaporated leaving as a residue 550 mg. of a slightly yellow oil which was further fractionally distilled in a high vacuum the pressure being 0.005 mm. Hg. At 50° bath temperature a first running came over which was discarded. The bulk of the mass passed at about 170°; its weight was 390 mg.

(c) *Fractionation of monoacetone-20.21-pregnene-4-one-3-diol-20.21*

The product of step b (390 mg.) was dissolved in 5 cm.$^3$ of pentane and filtered through a column of 5 g. of aluminium oxide. The column was washed twice with pentane which hardly eluted any material. Then the washing was repeated twice with a mixture of 20% benzene and 80% pentane. Still the elutrate contained only small amounts of solids which were worked up later together with the mother liquors remaining after the crystallisation of the α-form.

Now the elution was continued with a mixture of equal parts of pentane and benzene until practically no more solids were eluted. Upon evaporation the oxidation product crystallizes. The column was further washed with ether which eluted 50 mg. of unchanged starting material.

The ketone fraction was recrystallized from pentane whereby a part was obtained as pure crystals melting at 124–125°.

The lower melting and the syrupy components were now again subjected to a chromotographic separation whereupon the several elutrates with 50% benzene-pentane were worked up separately. In all 245 mg. crystals of the α-form (M. P. 122–124°) were obtained. After recrystallisation from pentane the melting point rose to 126° (corr.). $[\alpha]^{20}_D = +91.5° \pm 1°$ ($c = 2.252$ in acetone).

The α-mono-acetone - pregnene-4-diol - 20.21-one-3 is easily soluble in all organic solvents with the exception of petroleum ether. In water it is practically insoluble.

The mother liquors from the crystallisation of the α-form and the fraction which was obtained in the chromatographic separation only upon extraction with ether were united (180 mg.) and again refluxed with 4 cm.$^3$ of acetone, 15 cm.$^3$ of benzene and 0.4 mg. of aluminium tertiary butylate and worked up as described above. The chromatographic analysis is also repeated as described above but now gave as the main product the β-form of the mono-acetone-pregnene-4-diol-20.21-one-3. When recrystallized from pentane it was obtained in colourless leaflets melting at 132° which gave a strong melting point depression with the α-form described above. Yield 70 mg. $[\alpha]^{20}_D = +70.5° \pm 1.5°$ ($c = 1.701$ in acetone).

(d) *Preparation of free pregnene-4-diol-20.21-ones-3*

α-*Form*.—235 mg. of α-mono-acetone compound obtained according to (c) were dissolved in 8 cm.$^3$ of ethanol and upon addition of 10 cm.$^3$ of water and 2.5 cm.$^3$ of glacial acetic acid the solution was refluxed for 2 hours on a water bath. Then it was evaporated to dryness in vacuo whereupon the same treatment was twice repeated. The crystalline residue so obtained was extracted five times with ether which dissolved it almost completely. Upon evaporation 120 mg. of crystals melting at 166–176° (corr.) were obtained. $[\alpha]^{20}_D = +92.6° \pm 1°$ ($c = 1.932$ in abs. ethanol). The substance is easily soluble in ethanol and acetone, difficultly soluble in ether and hardly soluble in petroleum ether.

β-*Form*.—This one was prepared from the corresponding acetone compound in exactly the same way as the α-compound. The melting point, however, was 183–185° (corr.). The mixed melting point of α- and β-forms was 138–155° (corr.).

What I claim is:

1. A process comprising oxidizing compounds of the cyclopentano-dimethyl-polyhydro-phenanthrene series having at $C_{17}$ a side chain of the form —$CHR_1.CH_2R_2$, $R_1$ and $R_2$ standing for radicals which are convertible into a hydroxyl group, and a hydroxyl group at the carbon atom $C_3$ to convert the $C_3$ hydroxyl group to a keto group.

2. A process comprising oxidizing compounds of the cyclopentano-dimethyl-polyhydro-phenanthrene series having at $C_{17}$ a side chain of the form —$CHR_1.CH_2R_2$, $R_1$ and $R_2$ standing for radicals which are convertible into a hydroxyl group, and a hydroxyl group at the carbon atom $C_3$ to convert the $C_3$ hydroxyl group to a keto group and thereupon subjecting the product to a hydrolysis whereby to convert the $R_1$ and $R_2$ groups to hydroxyl groups.

3. The process of claim 1 in which $R_1$ and $R_2$ are acyloxyl groups.

4. The process of claim 2 in which $R_1$ and $R_2$ together form a group of the acetal type.

5. The process of claim 1 in which the oxidation is effected by means of dehydrogenating agents.

6. A process comprising treating pregnene-5-triol-3.20.21 with acetone, oxidizing the acetone compound and hydrolysing the product formed.

7. A process comprising treating a mixture of isomeric pregnene-5-triols-3.20.21 with acetone, oxidizing the acetone compounds formed and separating the oxidation product into the isomers forming its components.

8. A process comprising treating a mixture of isomeric pregnene-5-triols-3.20.21 with acetone, oxidizing the acetone compounds formed, separating the oxidation product into the isomers forming its components and subjecting at least one of the isomeric acetone compounds to a hydrolysis to split off the acetone.

9. Cyclopentano-dimethyl - polyhydro-phenanthrene compounds having at $C_3$ a keto oxygen and at $C_{17}$ a side chain of the form

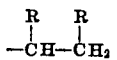

in which the substituents R are selected from the group consisting of hydroxyl groups and radicals which can be converted to hydroxyl groups by hydrolysis.

10. Compounds of the type as defined in claim 9 characterized by the occurrence of a double bond between the carbon atoms $C_4$ and $C_5$.

11. As new compositions of matter the compounds from the group consisting of the pregnene-4-one-3-diols-20.21 having the general formula $C_{21}H_{32}O_3$ and the structure

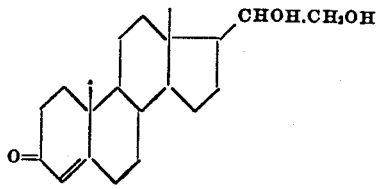

and their carboxylic acid esters.

12. α-Pregnene-4-one-3 - diol-20.21 having a melting point of 166–176° C.

13. β-Pregnene-4-one-3-diol-20.21 having a melting point of 183–185° C.

TADEUS REICHSTEIN.